March 13, 1945.   C. W. HOLTMAN   2,371,171
SPRING CLEVIS
Filed Jan. 8, 1944

INVENTOR
CHARLES W. HOLTMAN
BY
ATTORNEYS

Patented Mar. 13, 1945

2,371,171

UNITED STATES PATENT OFFICE 2,371,171

SPRING CLEVIS

Charles W. Holtman, Dayton, Ohio

Application January 8, 1944, Serial No. 517,519

5 Claims. (Cl. 287—96)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to clevises, and more particularly to an improved construction and arrangement whereby the clevis pin may be more quickly and easily removed and returned to position.

In common practice, a clevis pin is held in the clevis by providing the pin with a head on one end and either a nut or a transverse hole with a cotter pin therein on the other. In either case considerable time is required, when the clevis pin is to be removed, for first removing the nut or the cotter pin as the case may be before the clevis pin may be withdrawn. Moreover, clevises of this kind are located in most inaccessible places, particularly in aircraft, often being in positions where only one hand may be gotten to them for removing the clevis pin and separating the part which the pin connects to the clevis.

It is therefore an object of this invention to provide a resilient means for holding the clevis pin in its place against which only a relatively moderate manual effort, which may be accomplished with one hand, need be exerted to withdraw the pin and separate or reassemble the parts.

Another drawback with the clevis pin of conventional design is that, being completely separable from the clevis when removed from the pin hole, it is often lost.

It is therefore another object of the invention to so construct and arrange the improved pin holding means that it will retain the pin adjacent the pin hole even when it becomes withdrawn from its place in the clevis.

Clevises used on aircraft and automotive land vehicles have been well standardized, and it therefore becomes important that any improvement, which is to be attached to the clevis, be so made that no drilling, tapping or similar modification be required in the clevis itself.

It is therefore another object of the invention to so construct the resilient clevis holding means of my invention that it may be attached to a standard clevis without any alteration of the clevis whatsoever.

Other objects and advantages will be seen as the invention is further described, reference being had to the drawing, wherein, Fig. 1 is a perspective view of the device before it is assembled on a standard clevis.

Like reference characters refer to like parts throughout the drawing.

Figure 1:
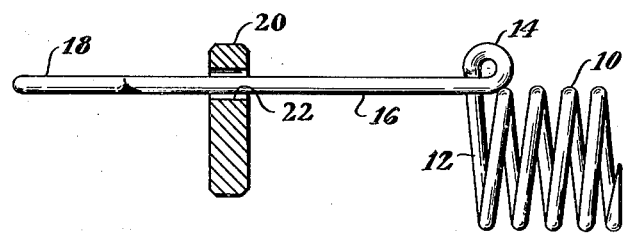

Referring to Fig. 1, a single length of wire has one end formed into an open coil spring 10. A small portion of wire at the end of the last coil 12 of the spring is brought out beyond the spring diameter and formed with a single loop 14, the axis of the loop 14 being substantially normal to the axis of the spring 10. The portion of the wire remaining after forming the spring 10 and loop 14 is extended to form a cantilever parallel to the axis of the spring as at 16. The outer end of the cantilever is formed into an oval shape 18. A clevis pin 20 has a transverse clearance hole 22 through which the part 16 passes loosely. The part 16 must be extended through the hole 22 before the oval shape 18 is formed on the end. With this construction the clevis pin may not be accidentally dropped and lost, but must always remain proximate the place where it is used. The parts described with reference to Fig. 1 are the novel features of the invention. The assembly Fig. 2 shows these parts in operative position on a standard clevis.

Figure 2:
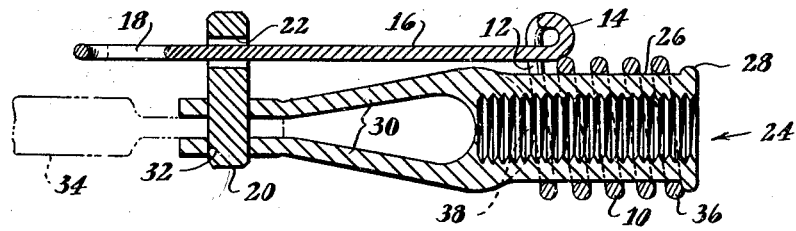
Fig. 2 is an axial section of a standard clevis with the improved pin holder thereon.
Figure 3:
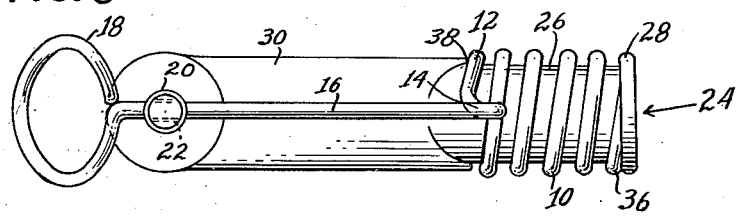
Fig. 3 is a top plan view of the assembly shown in section in Fig. 2.

In Fig. 2, the clevis 24 is of standard form and comprises a hub 26 which has an annular rib 28 at the outer end and a pair of prongs 30 extending from the inner end. An axially transverse hole 32 is provided at the outer ends of the prongs for the clevis pin 20. A clevis ended rod 34 is shown held in position in the clevis by the clevis pin.

In winding the coil spring 10, the inside diameter of the coils is made slightly less than the outside diameter of the hub 26, and the length of the spring is such that the first coil 36 bears against the rib 28 while the last coil 12 bears against the shoulder 38 formed at the juncture between the hub 26 and the prongs 30.

In combining a novel unit, as shown in Fig. 1, with a standard clevis as assembled in Fig. 2, it is necessary that the spring 10 be expanded, preferably with some appropriate expanding tool, to a larger diameter in order that the hub 26 may be inserted, and it is, of course, necessary to exercise care that the spring, in this operation, be not expanded beyond its elastic limit, so that when the hub is entered, and the expanding tool is removed, the spring will grip the hub tightly, and thus securely fasten the spring to the hub without having in any manner altered or modified any part of the clevis. The annular rib 28 and the shoulder 38 prevent axial movement of the spring 10 on the hub 26 and the grip of the coils of the spring oppose both axial movement of the spring and rotation on the hub.

The desirability of the device is obvious. In order to unfasten a connection employing the improved device herein shown, the mechanic need only grasp the clevis ended rod 34 with the fingers, and, with the tip of his thumb, push the oval thumb piece 18 outwardly until the rod 34 is free. The clevis pin will be returned to the position shown in Fig. 2 by the spring parts 14 and 16 when the thumb piece 18 is released after the rod is free, or, if the clevis pin is inadvertently completely withdrawn from the clevis the oval thumb piece will prevent the pin being lost. These are valuable features, particularly when employed in inaccessible places such as are found in aircraft or the like, where, in many cases, it is difficult to reach the connection with both hands at the same time. Of course, the device may be somewhat simplified by omitting the oval thumb piece, since it would be operative and of considerable value without that feature. Also, the rib 28 could be omitted from the hub 24 and dependence placed in the grip of the coils to prevent axial movement of the spring on the hub without destroying the operativeness of the device. Likewise, the single loop 14 might be omitted and still have flexibility enough in the part 16 to permit withdrawal of the pin 20.

Having this view of the scope of the invention, I claim:

1. For use with a clevis of the type having a hub with a two pronged fork extending substantially in an axial direction from one end, and having clevis pin holes extending through the free ends of the prongs transverse to the hub axis, an improved clevis pin and holder, said pin having a pin retaining hole transverse to its axis and said holder being made of a single piece of spring wire, one end of which is formed into a clevis hub gripping means in the form of a helical coil spring having an inside diameter slightly less than the outside diameter of said hub and a length substantially as long as the hub, the mid portion of said wire adjacent the end coil of said spring being formed into a single loop, the axis of which is normal to the helical coil spring axis, and the remainder of the wire being extended to form a cantilever spring substantially parallel to the helical coil spring axis, through the transverse pin retaining hole in the clevis pin and then having the end portion formed into a manually engageable thumb piece of a size which will prevent the pin being removed from the holder.

2. For use with a clevis of the class having a hub with an annular rib around one end and a two pronged fork extending substantially in an axial direction from the other end, and having clevis pin holes extending through the free ends of the prongs transverse to the hub axis, an improved clevis pin and holder, said pin having a hole transverse to its axis and said holder being made of a single piece of spring wire, one end of which is formed into a hub gripping means in the form of a helical coil spring having an inside diameter slightly less than the outside diameter of said hub and a length to substantially fill the space between said rib and the point of attachment of said prongs, the mid portion of said wire adjacent the end coil of said spring being formed into a single loop, the axis of which is normal to the spring axis, and the remainder of the wire being extended in cantilever fashion substantially parallel to the spring axis, through the transverse hole in the clevis pin.

3. For use with a clevis of the kind having a hub with a two pronged fork extending substantially in an axial direction from one end, and having clevis pin holes extending through the free ends of the prongs transverse to the hub axis, an improved clevis pin and holder, said pin having a hole transverse to its axis and said holder being made of a single piece of spring wire, one end of which is formed into a hub gripping means in the form of a helical coil spring having an inside diameter slightly less than the outside diameter of said hub and a length substantially as long as said hub, and the other portion of the wire being so formed that it extends as a cantilever spring substantially parallel to the helical coil spring axis, through the transverse hole in the clevis pin and then having the end portion bent into a shape which prevents its removal from said pin.

4. For use with a clevis having a hub at one end, and an opening for a clevis pin at the other end, an improved clevis pin and holder, said pin having a hole transverse to its axis and said holder being made of a single piece of helical coil spring wire, one end of which is formed into a spring gripping means adapted to tightly encircle the hub of said clevis and thereby fasten the holder to the hub without other support, and the other end of the wire being so formed into a cantilever spring that it extends substantially parallel to the hub axis, and through the transverse hole in the clevis pin.

5. For use with a standard clevis having a clevis pin opening extending transversely through one end, an improved clevis pin and holder, said pin having a means for permanent attachment to said holder and said holder having a helical coil spring gripping means at one end adapted to encircle a part of said clevis and attach said holder to said clevis without other means of support, a resilient means between said spring and said pin for holding said pin in the clevis, and a manual means for withdrawing said pin against the resistance of said resilient means.

CHARLES W. HOLTMAN.